United States Patent

Piret

[11] Patent Number: 6,084,918
[45] Date of Patent: *Jul. 4, 2000

[54] DATA TRANSMISSION METHOD AND DEVICES

[75] Inventor: Philippe Piret, Cesson-Sevigne, France

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/848,617

[22] Filed: Apr. 29, 1997

[30] Foreign Application Priority Data

Jun. 13, 1996 [FR] France .................................... 9607366

[51] Int. Cl.$^7$ .......................... H04L 23/02; H04L 27/36; H03C 3/00
[52] U.S. Cl. ........................... 375/261; 375/298; 332/103
[58] Field of Search ............................. 370/206; 375/261, 375/265, 298; 332/103, 108; 329/304, 345, 347

[56] References Cited

U.S. PATENT DOCUMENTS

| | | | |
|---|---|---|---|
| 4,922,506 | 5/1990 | McCallister et al. | 375/1 |
| 5,063,571 | 11/1991 | Vancraeynest | 375/1 |
| 5,414,728 | 5/1995 | Zehavi | 375/200 |
| 5,696,800 | 12/1997 | Berger | 375/361 |
| 5,838,727 | 11/1998 | Lyon et al. | 375/261 |
| 5,903,609 | 5/1999 | Kool et al. | 375/261 |

FOREIGN PATENT DOCUMENTS

| | | |
|---|---|---|
| 257301 | 3/1988 | European Pat. Off. . |
| 565506 | 10/1993 | European Pat. Off. . |
| 687074 | 12/1995 | European Pat. Off. . |

OTHER PUBLICATIONS

P.Z. Fan et al., "New class of polyphase sequence with two–valued auto–and crosscorrelation functions,"Electronics Letters, vol. 30, No. 13, Jun. 23, 1994, pp. 1031–1032.

French Search Report for Application No. 96 07366.

*Primary Examiner*—Chi H. Pham
*Assistant Examiner*—Khai Tran
*Attorney, Agent, or Firm*—Fitzpatrick, Cella, Harper & Scinto

[57] ABSTRACT

For each data element (symbol), a sequence of N points from a QAM constellation is transmitted. If the symbol period is T, then each point in the sequence may have a duration T/N. The sequence is determined by treating the constellation as a finite ring, and repeatedly multiplying the data point by a constant point.

29 Claims, 7 Drawing Sheets

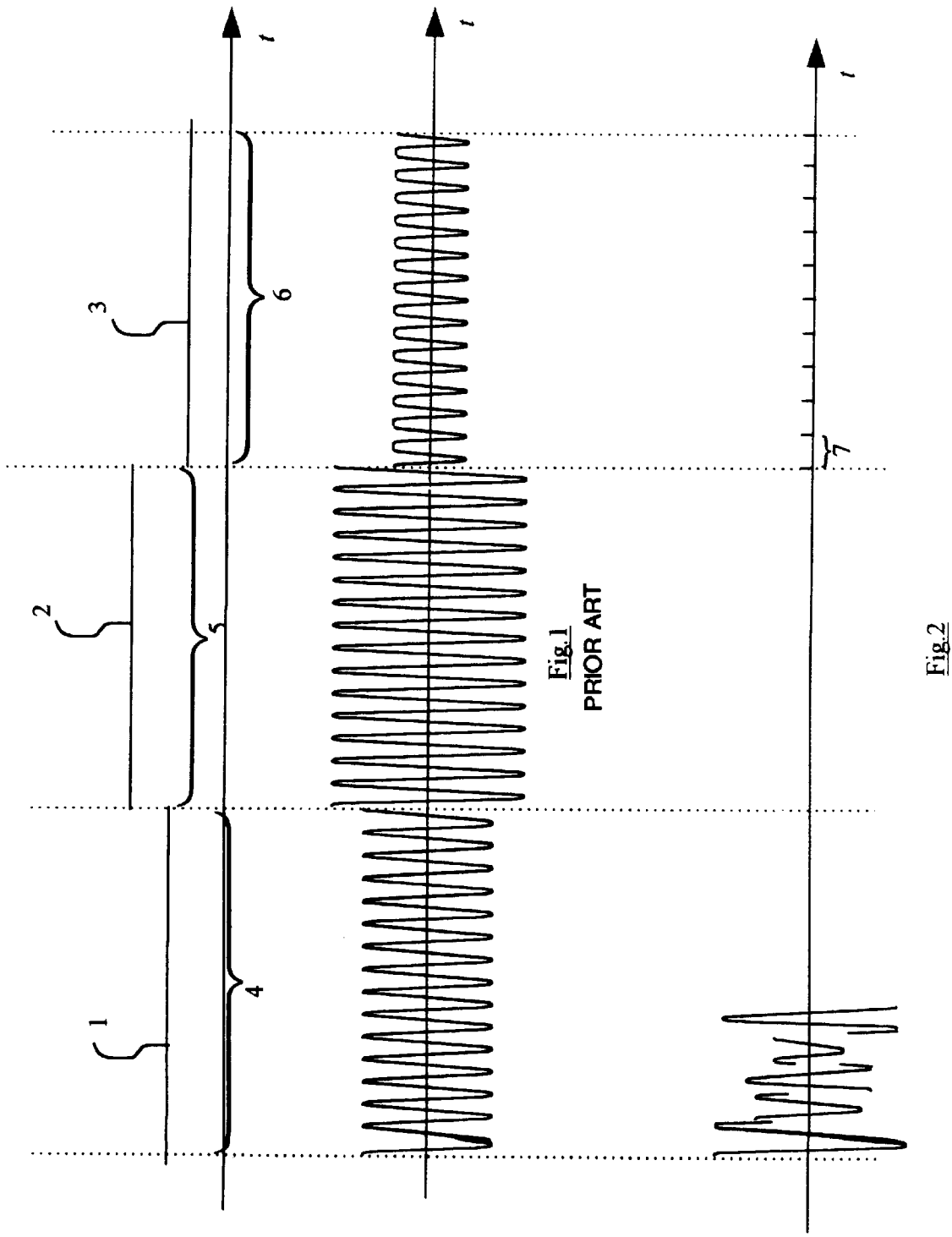

DATA TRANSMISSION METHOD AND DEVICES

BACKGROUND OF THE INVENTION

1. Field of the Invention

The present invention concerns a method and devices for the transmission of data for quadrature amplitude modulation.

It applies to the transmission of data over any transmission channel using this modulation.

2. Description of the Related Art

Quadrature amplitude modulation of signals is well known in the communications field. According to this modulation technique, there is associated with data to be transmitted a signal which is of constant frequency but whose amplitude and phase represent the data.

However, on reception, these signals may sometimes be difficult to identify if, during transmission, the signal has been distorted.

In addition, the spectrum of these signals may be relatively narrow compared with the spectrum available for transmission. This gives rise to known drawbacks. By way of example, two of these drawbacks are mentioned below:

- when the energy of the signals is concentrated in an excessively narrow spectrum, these signals are easily detected and interfered with by enemies;
- for some applications, regulations require the energy of the signals to be distributed sufficiently over the entire frequency band available.

The invention sets out to remedy these drawbacks by proposing a method and devices for data transmission having the following advantages:

- the signals are more difficult to detect and to interfere with;
- the distribution of energy over the available frequency band is improved;
- the resistance of the signals to unintentional noise is increased.

BRIEF SUMMARY OF THE INVENTION

To this end, the invention relates to a method of data transmission by modulation of periodic signals, characterised in that, with each item of data to be transmitted, with a data transmission period equal to T, there is correlated a number N, equal to at least two, of pairs of phase and amplitude values, and in that a sequence of N periodic signals is successively sent for a period equal to T, each having the phase and amplitude values of one of the pairs.

Thus, compared with the prior art, in order to represent a data item to be transmitted, a signal whose phase and amplitude are constant for a given period T is replaced by a sequence of successive signals, each having constant phase and amplitude, and which are all sent during the same given period T.

By virtue of these arrangements, on the one hand resistance to noise is increased and on the other hand the spectrum of the signal transmitted is spread out.

The representation of a numerical value to be transmitted by at least two pairs of phase and amplitude values makes it possible to make the pairs more dissimilar (and therefore more differentiable and more identifiable) than are the numerical values to be transmitted.

By choosing, in order to represent all the possible data values, sequences of recognisable phase and amplitude pairs, with any noise or interference which would dephase certain signals or modify their amplitude, they remain recognisable.

By virtue of these arrangements, communication means are used whose components, which act on the phase and amplitude of the signals, are known to persons skilled in the art and are therefore simplified.

According to particular characteristics, each of the N periodic signals is sent for a period equal to T/N.

Thanks to these characteristics, the phase values and the amplitude values of the N periodic signals are all similarly identifiable, since the period for their identification is always equal to T/N.

According to particular characteristics, in order to represent the data to be transmitted, a set of sequences is chosen, a set whose mean square deviation of the ratio of the energy to the mean energy of all the sequences of the said set is smaller than on average for the other sets of sequences each containing the same number of sequences as the first mentioned set.

In this way it is possible more easily to use automatic gain control means in order to keep the signal reception conditions as constant as possible and thus to avoid any undesired and excessive variation in the amplitude of the signals received.

According to other particular characteristics, the sequences of signals are chosen so that their probabilities of error in interpretation are substantially equal.

By virtue of these characteristics, these probabilities of error in interpretation can be reduced compared with what they would be without the use of the invention, and thus afford better transmission of the data.

According to other characteristics, each phase and amplitude pair in such a sequence of signals is derived from the previous pair by a function of combination with a constant pair.

The recurrence of the determination of each of the pairs thus makes possible a simplified implementation of the method of the invention.

According to other particular characteristics, for locating each periodic signal phase and amplitude pair, a pair of figures (a,b) is used, each term of which is an integer between zero and n−1 inclusive.

Thus, in the case mainly described to illustrate the present invention, using quadrature amplitude modulation, each signal is represented by a point of a planar configuration known to persons skilled in the art (the constellation depicted in FIG. 3). Rather than specifying a point by a phase and amplitude pair, it is often specified hereinafter by a pair of horizontal and vertical planar coordinates.

According to other particular characteristics, the function of combination of the pairs is calculated for each of the terms, modulo n.

Thus, whatever the combination function chosen, calculating modulo n ensures that the result is between 0 and n−1.

According to other particular characteristics, the number n is equal to 8, and with each pair the combination function associates the result of the function of combination of the pair with a constant pair whose period is 12.

In this way the invention applies to quadrature amplitude modulation having 64 pairs of phase and amplitude values.

The invention also relates to a method of transmitting data by modulation of periodic signals, characterised in that the data to be transmitted are distributed between processing channels, each processing channel receiving so-called "intermediate" data, and in that, by means of each processing channel, the intermediate data are processed according to the method correlating pairs with them, as briefly set out above, and in that a combination of the successive phase and amplitude pairs coming from the processing channels is sent in succession.

By virtue of these arrangements, the flow of data transmitted is increased by the use of several channels.

The invention also relates to a means of transmitting data supplied, by a data source, by modulation of periodic signals, characterised in that it includes an encoder adapted to supply, for each of the data items to be transmitted, a number N, equal to at least two, of pairs of numerical values representing on the one hand a phase and on the other hand an amplitude, and a modulator adapted to send for a period equal to T, a sequence of N modulated periodic signals whose phases and amplitudes correspond successively to the numerical values of a pair supplied by the encoder.

According to particular characteristics, each of the periodic signals is sent during a period equal to T/N.

According to particular characteristics, the encoder is adapted to supply, amongst the possible sequences of pairs, a set of sequences of pairs corresponding to sequences of periodic signals sent by the modulator, a set whose mean square deviation of the ratio of the energy to the mean energy of all the sequences in the set is smaller than on average for all the other sets of sequences which the encoder could supply.

According to other characteristics, the encoder is adapted to supply sequences of pairs of numerical values such that the probabilities of error in interpretation between the sequences of corresponding signals sent by the modulator are substantially equal.

According to particular characteristics, the transmission means according to the invention includes a means of combining phase and amplitude pairs of a signal and, each time an interval of time T/N has passed, the combination means is adapted to combine the previous pair with a constant pair in order to supply the new pair.

According to other particular characteristics:

the combination means is adapted to locate each periodic signal phase and amplitude pair by means of a pair of figures (a,b), each term of which is an integer between zero and n−1 inclusive;

the combination means is adapted to calculate the function of combination of the pairs, for each of the terms, modulo n;

the combination means is adapted to associate the pair $(a_1.a_2+(n-1).b_1b_2, b_1a_2+b_2a_1+(n-1).b_1b_2)$ with two pairs $(a_1, b_1)$ and $(a_2, b_2)$, each addition being performed modulo n;

the number n is equal to 8, and with each pair the combination means associates the result of the function of combination of the pair with a constant pair whose period is 12.

The invention also relates to a means of transmitting data supplied by a data source, by modulation of periodic signals, characterised in that it includes a serial/parallel converter adapted to distribute the data coming from the data source between processing channels, in that each processing channel includes an encoder according to the invention as briefly described above, and in that it includes a means of combining the pairs coming from the processing channels, supplying a pair of numerical values representing phase and amplitude, the modulator supplying a signal representing the latter pairs.

The data transmission means which have characteristics corresponding to those of the methods briefly set out above have the same advantages as these methods. These advantages are therefore not restated here.

The invention also relates to a data reception means modulating a periodic signal characterised in that it includes a means of correlating a sequence of a number N, at least equal to two, of pairs of values representing pairs of phases and amplitudes presented successively by the signal, with for a period T, a single item of data being able to adopt a number of different values less than or equal to the number of different phase and amplitude pairs.

By virtue of these arrangements, the reception means is adapted to receive data transmitted by a transmission means as briefly disclosed above.

Finally, the invention relates to a computer, a facsimile machine, a data capture system and a data reproduction system characterised in that they include a data transmission means as briefly disclosed above or a data reception means as briefly disclosed above.

Other advantages, aims and characteristics will emerge from the following description, given with respect to the accompanying drawings:

BRIEF DESCRIPTION OF THE SEVERAL VIEWS OF THE DRAWINGS

FIG. 1 depicts a signal representing data which is known in the prior art;

FIG. 2 depicts a signal representing data, according to a first aspect of the invention;

DETAILED DESCRIPTION OF THE INVENTION

The aim of the invention is to reduce errors in interpretation, that is to say any differences between the numbers to be transmitted and the numbers which correspond to them after transmission.

The description which follows describes a method and devices adapted to cases of quadrature amplitude modulation having 64 different pairs of phases and amplitudes in quadrature and commonly called 64-MAQ (initials of the French words Modulation d'Amplitude en Quadrature) or 64-QAM (initials of the English words Quadrature Amplitude Modulation) by telecommunications experts.

In FIG. 1, data 1, 2 and 3 can be seen, to be sent during successive intervals of time 4, 5 and 6. These data can each take 64 different values. They come from a data source.

In the prior art, each of these data is represented, during remote transmission, by a periodic signal, generally sinusoidal, whose phase, frequency and amplitude are constant within each interval of time. Between two intervals of time, on the other hand, the phase and amplitude vary.

Figure 3:
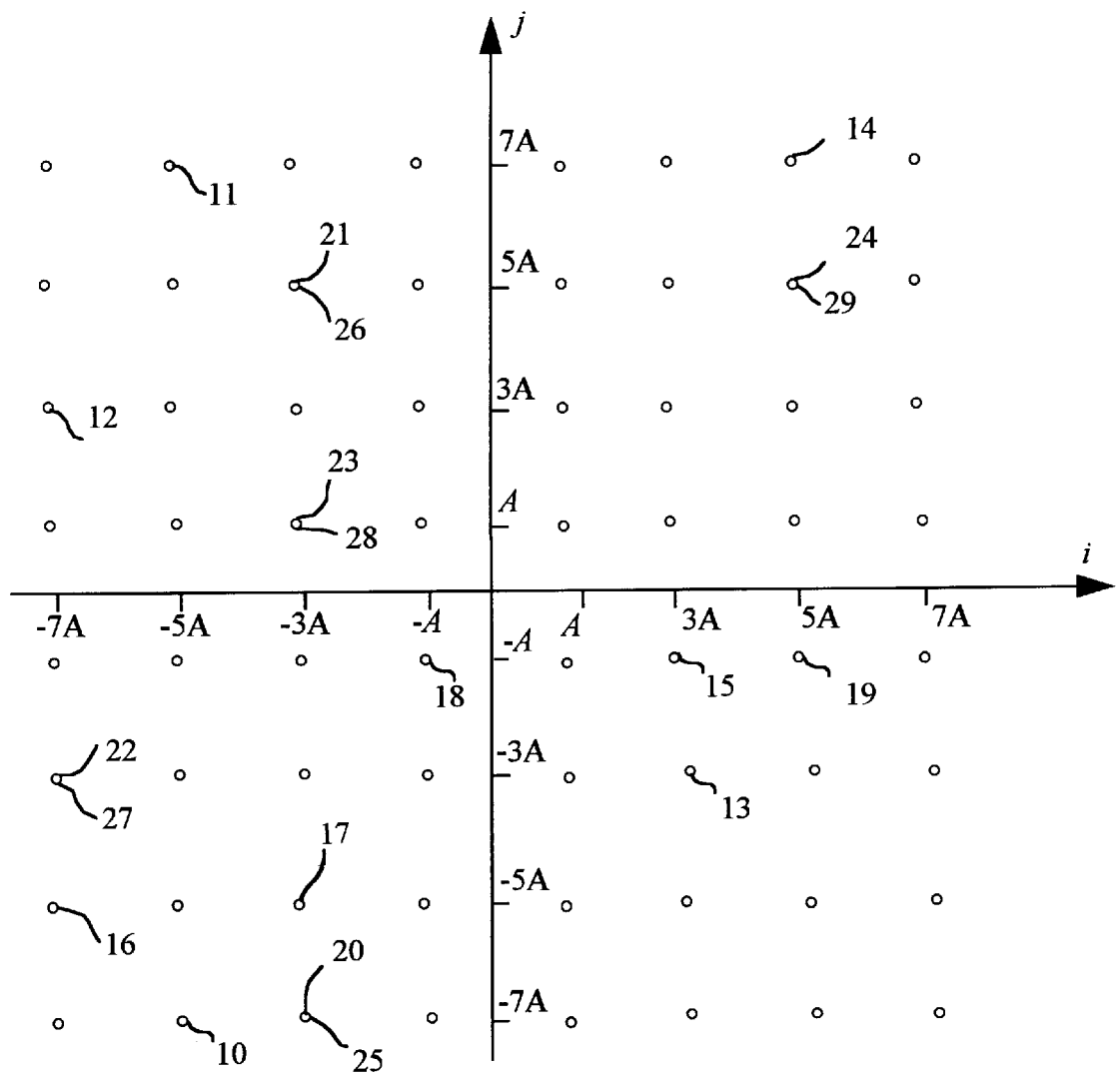
FIG. 3 depicts successive signal phases and amplitudes representing an item of data, according to the invention.

As disclosed above with regard to FIG. 3, this phase and this amplitude can be replaced in cases of quadrature amplitude modulation by a pair of horizontal and vertical planar coordinates. In the case of quadrature amplitude modulation, these two horizontal and vertical planar coordinates can each take eight different values so that the pair, and therefore the signal that it represents, can take 64 different values.

According to the invention, applied here to order 64 quadrature amplitude modulation transmission, on the other hand, each interval of time corresponding to a data item to be transmitted is divided into a large number (here ten) of time intervals 7 (FIG. 2). During all these intervals of time 7, the phase of the signal representing each data item to be transmitted takes at least two successive values (here ten).

Likewise, the amplitude of the signal representing each data item to be transmitted takes at least two successive values (here ten) 8A to 8J.

On the other hand the frequency of the signal representing each data item to be transmitted does not vary, either within an interval of time corresponding to a data item to be transmitted, or between two of these intervals of time.

In FIGS. 1 and 2, the periods of the carrier wave signals are not to the same scale as the durations of the intervals of time during which the phases and amplitudes of the signals are constant. These periods have been multiplied for the depictions in FIGS. 1 and 2, so that the phases of the signals can be observed. In reality, the interval of time 7 has a duration much greater than this period and it is chosen so as to allow discrimination of all the phase and amplitude values used and the reconstitution of the initial signal.

For convenience, each of the signals sent during each of the intervals of time 7 has been depicted (FIG. 3) by a complex number, in a complex plane. As known to persons skilled in the art, each complex number corresponding to a signal takes its amplitude as the modulus value and its phase as the argument value.

It will be observed, in FIG. 3, that for each of these complex numbers, the real part, on the X-axis in a depiction of the complex plane, can take eight different values, and that the imaginary part, on the Y-axis in the same depiction, can take eight values.

The complex numbers 10 to 19 correspond to the signals successively sent in order to represent a single data item to be transmitted and the complex numbers 20 to 29 correspond to the signals successively sent in order to represent another data item to be transmitted. How they are chosen is explained below.

A description will now be given, with the help of FIG. 4, of a schematic block view of a means of sending a signal representing data to be transmitted according to the invention. This device is depicted under the general reference 40. It includes, connected together by an address and data bus 46:

- a central processing unit 41,
- a random access memory 42,
- a read only memory 43,
- an input port 44 serving to receive data to be transmitted from a data source 49;
- an output port 45 enabling the device to transfer respectively the values of the real and imaginary parts of the complex numbers associated with the signal to be sent, resulting from the processing of the data received at the input port 44;
- a modulator 47 modulating a physical quantity predetermined by the signals.

The random access memory 42 includes notably a register initialdata, storing the sequence of data to be transmitted, as well as registers storing groups of variables described below, completeddata, i, j, (a,b).

Figure 5:
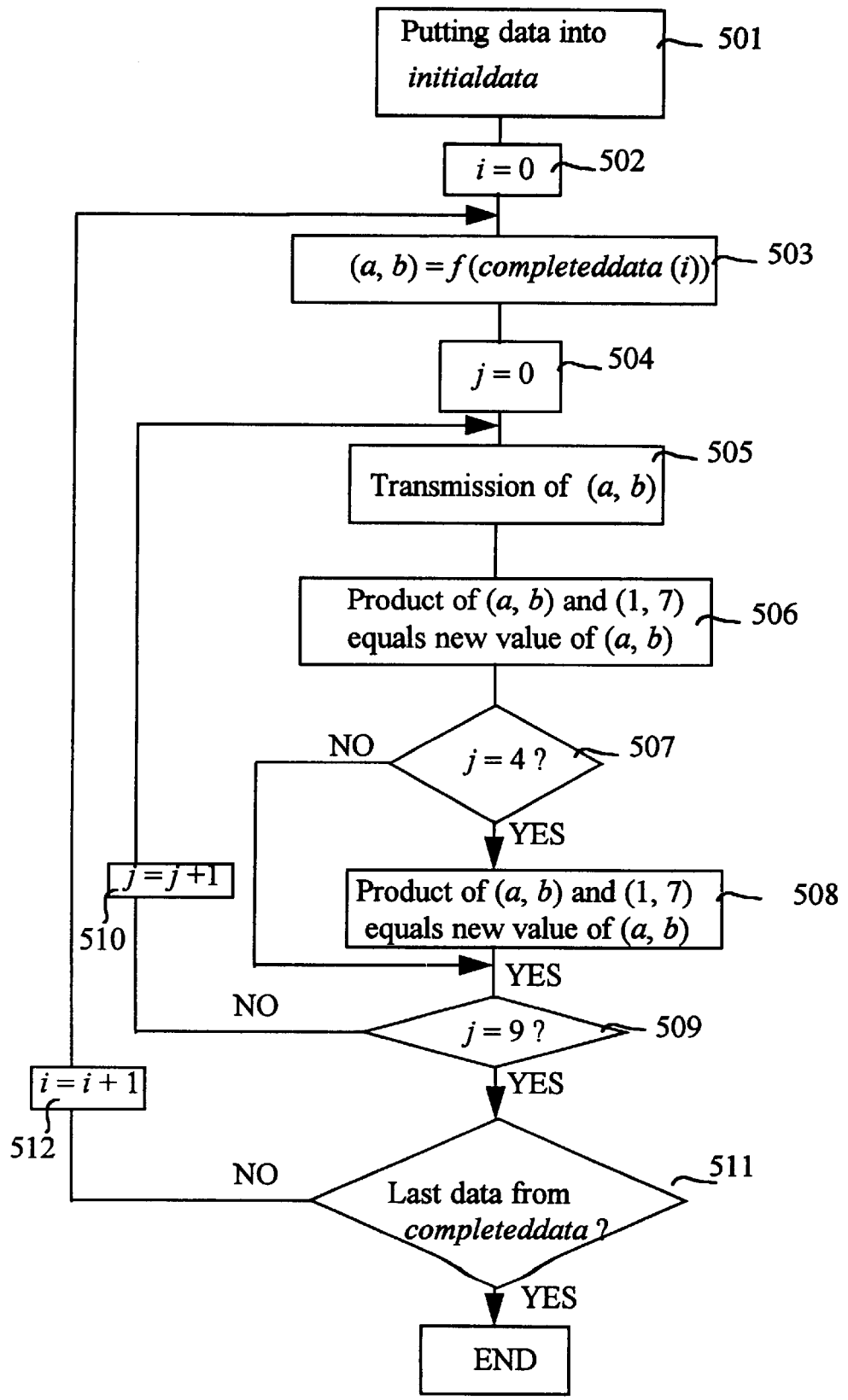
FIG. 5 depicts a signal transmission flow chart according to the invention.

The read only memory 43 is adapted to store a constant value g and the operating program of the device and of the central processing unit 41 so that the latter is adapted to implement all the operations presented in the flow diagram in FIG. 5.

The modulator 47 modulates the predetermined physical quantity by a signal of constant frequency, and with a corresponding phase and amplitude, according to the depiction presented with regard to FIG. 3, to the complex numbers whose real and imaginary parts form the pair coming from the output port 45.

The physical quantity can be electromagnetic, optical, acoustic, or carried by a network or wireless, for example. In the example described and depicted, a radio aerial transmits an electromagnetic wave proportional to the signal which it receives from the modulator 47.

This configuration is known to persons skilled in computer systems and is therefore not described any more precisely here.

The data source 49 regularly produces a data item which can take m different values. The transmission means 40 represents this data by a sequence of N symbols in the alphabet of 64 signs of the order 64 quadrature amplitude modulation (the graphical representation of the alphabet being given in FIG. 3). Naturally this implies that m is less than $64^N$.

In the embodiment described and depicted, the value of N is ten and the value of m is sixty four. Each data item sent with a period T is represented by ten symbols, sent with a period T/10.

Thus, according to a general characteristic of the invention, each data item is represented at least twice, by modulation of the phase and amplitude of the carrier signal, by symbols whose phase and amplitude values are different.

It should be noted that the dispersion factor, equal to the product of N and the Napierian logarithm of 64, divided by the Napierian logarithm of the number m of values which can be taken by the data supplied by the data source, can, according to the invention, be fixed arbitrarily.

The frequency f of the periodic signal constituting the carrier wave of the phase and amplitude modulated signals is much greater than the ratio of N to T.

The signal sent by the modulator is, for the time t between i.N/T and (i+1).N/T, equal to:

$$f(t) = a_i \cos(2\pi f t) - b_i \sin(2\pi f t) \qquad (1)$$

a formula in which:

t is the time since an origin chosen so that the phase of the carrier wave is null, $\pi$ is the mathematical constant, $a_i$ and $b_i$ can each take the values (−7A, −5A, −3A, −A, A, 3A, 5A, 7A), and A is a constant.

The 64 signals resulting from modulation are represented in the complex plane, with $a_i$ as the real part and $b_i$ as the complex part, in FIG. 3.

With each of these points, there is associated a pair of values between 0 and 7, whilst causing to correspond, for a choice, which may be any but is fixed, of the numbers r and s, each amongst the values 0,1,2, . . . ,7 on the X-axis:

| | | |
|---|---|---|
| to − 7 A | the number r | (2) |
| to − 5 A | " | r + 1 modulo 8 |
| to − 3 A | " | r + 2 modulo 8 |
| to − A | " | r + 3 modulo 8 |
| to + A | " | r + 4 modulo 8 |
| to + 3 A | " | r + 5 modulo 8 |
| to + 5 A | " | r + 6 modulo 8 |
| to + 7 A | " | r + 7 modulo 8 | and on the Y-axis:

| | | |
|---|---|---|
| to 7 A | the number s | (3) |
| to − 5 A | " | s + 1 modulo 8 |
| to − 3 A | " | s + 2 modulo 8 |
| to − A | " | s + 3 modulo 8 |
| to + A | " | s + 4 modulo 8 |
| to + 3 A | " | s + 5 modulo 8 |
| to + 5 A | " | s + 6 modulo 8 |
| to + 7 A | " | s + 7 modulo 8 |

It will be noted that the value of the constant chosen to specify the above correlation can be different for the real parts, constant r, on the one hand, and for the imaginary parts, constant s, on the other hand.

In addition, the second term, the imaginary part $b_i$, of this pair $(a_i, b_i)$ is multiplied by the symbol B, the use of which is described below and which satisfies:

$$B^2 + B + 1 = 0. \tag{4}$$

In this way, by choosing for example, $$r = s = 0, \tag{5}$$

the point $c_1$, the real part of which is equal to −3A and the imaginary part of which is equal to +5A, is denoted 2+6B, and the point $c_2$, the real part of which is equal to +3A and the imaginary part of which is equal to +A, is denoted 5+4B.

By adding and subtracting, term by term, the pairs representing these points, modulo 8, an additive structure is defined for all of them. A multiplication is also defined for this set of first degree polynomials at B and which are associated as explained below and biuniquely with the sixty four possible amplitude and phase pairs considered here. For this purpose, the calculations of the coefficients of the polynomial produced are effected, reducing them modulo 8. In addition, since the product of two first degree polynomials generally gives a second degree polynomial, this excessively high degree is reduced by using the equation $$B^2 + B + 1 = 0 \tag{4}$$

which, modulo 8, is equivalent to $$B^2 = 7B + 7. \tag{6}$$

Thus the product of $a_1 + b_1 \cdot B$ and $a_2 + b_2 \cdot B$ gives:

$$(a_1.a_2 + 7.b_1 b_2) + (b_1 a_2 + b_2 a_1 + 7 b_1 b_2).B. \tag{7}$$

According to the embodiment of the invention described and depicted, the transmission means 40 effects the product of a pair representing the data to be transmitted and the sequence of the powers of a number g of the set presented above.

It will be observed, in this regard, that 16 components of this set have powers which take 12 different values, no components having more than 12 different powers. For the value of the constant g, one of these 16 components is preferentially chosen.

According to an advantageous characteristic of the invention, amongst the possible signal sequences there is chosen, to represent the data to be transmitted, a set of sequences, a set whose mean square deviation of the ratio of the energy to the mean energy of all the sequences in the set, is smaller than it is on average for the other sets of sequences each containing the same number of sequences as the first mentioned set.

It should be stated here that the mean square deviation of the energies is a function of the square of the differences between the energy of each signal and the mean energy of all the signals.

It should also be stated that the energy is, at each moment, proportional to the square of the amplitude of the signal and is independent of its phase. Preferentially, the sequences of signals are chosen so that their probabilities of error in interpretation are substantially equal.

For these two reasons, in the embodiment described and depicted, $$g = 1 + 7.B. \tag{8}$$

The transmission means is therefore adapted to multiply the preceding value of the number of the set by a constant multiplication factor, each time a period T/N has elapsed.

In the embodiment described and depicted, the constant multiplication factor is the number g=1+7.B. Thus the product of a number a +b.B and the number g gives:

$$c.g = (a+b) + (2.b-a).B. \tag{9}$$

In this embodiment, N being equal to 10 and the number of different powers of g being equal to 12, at the end of each series of five intervals of time of duration T/N, the multiplication factor g is applied to the square.

Thus, as depicted in FIG. 5, the central unit 41 begins the processing of the data to be transmitted with the operation 501, which consists of receiving these data successively at the input port 44 and putting them in the register initialdata of the random access memory 42.

The operation 502 initialises to zero the value of the variable I stored in the register i of the random access memory 42. The operation 503 consists of putting the data numbered i in the register completeddata in biunique relationship with a pair (a,b), each term of which has an integer value between zero and seven.

The operation 504 initialises to zero the value of the variable j in the register j of the random access memory 42.

The operation 505 consists of transmitting to the output port 45 the pair of values (a,b). The operation 506 consists of replacing the pair (a,b) by the new pair (a,b) in which the two terms are calculated recurrently as follows: the new value of a is equal to the sum of the former values of a and b and the new value of b is equal to the difference between twice the former value of b and the former value of a, each of these terms being calculated modulo 8.

The test 507 determines whether or not j is equal to 4. If the result of the test 507 is positive, the operation 508 performs the same recurrent operation on the pair (a,b) as the operation 506.

If the result of the test 507 is negative or at the end of the operation 508, the test 509 determines whether or not j is equal to 9. If the result of the test 509 is negative, the operation 510 increments by one unit the value of the variable j in the register j and the central unit 41 returns to the operation 505.

If the result of the test 509 is positive, the test 511 determines whether or not the value of I corresponds to the last data item in the register completeddata. If the result of the test 511 is negative, the operation 512 increments by one unit the value of the variable i and the central unit 41 returns to the operation 503. If the result of the test 511 is positive, the transmission of the data is completed.

Figure 6:
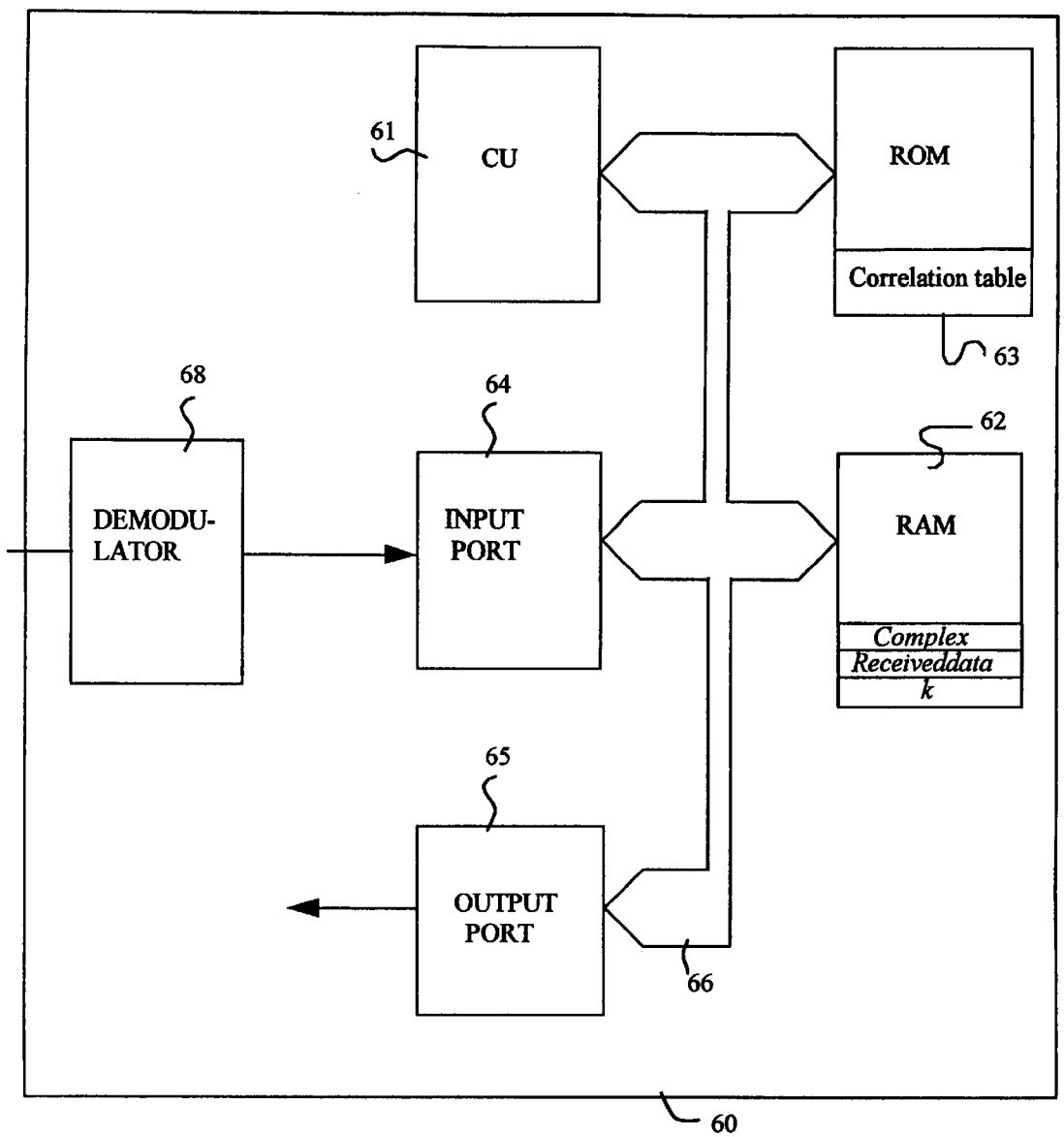
FIG. 6 depicts a signal reception means according to the invention.

In FIG. 6, the data reception device is depicted under the general reference 60. It includes, connected together by an address and data bus 66:

- a central processing unit 61,
- a random access memory 62,
- a read only memory 63,
- a demodulator 68 demodulating the physical quantity modulated by the modulator 47, into pairs of data representing the real parts, on the X-axis, and imaginary parts, on the Y-axis, of the complex number associated with the phases and amplitudes of the signal received, in accordance with the biunique correlation presented with regard to FIG. 3;
- an input port 64 serving to receive the signals demodulated by the demodulator 68;
- an output port 65 enabling the device to transfer the sequence of data received resulting from the processing of the sequence of data pairs.

Figure 7:
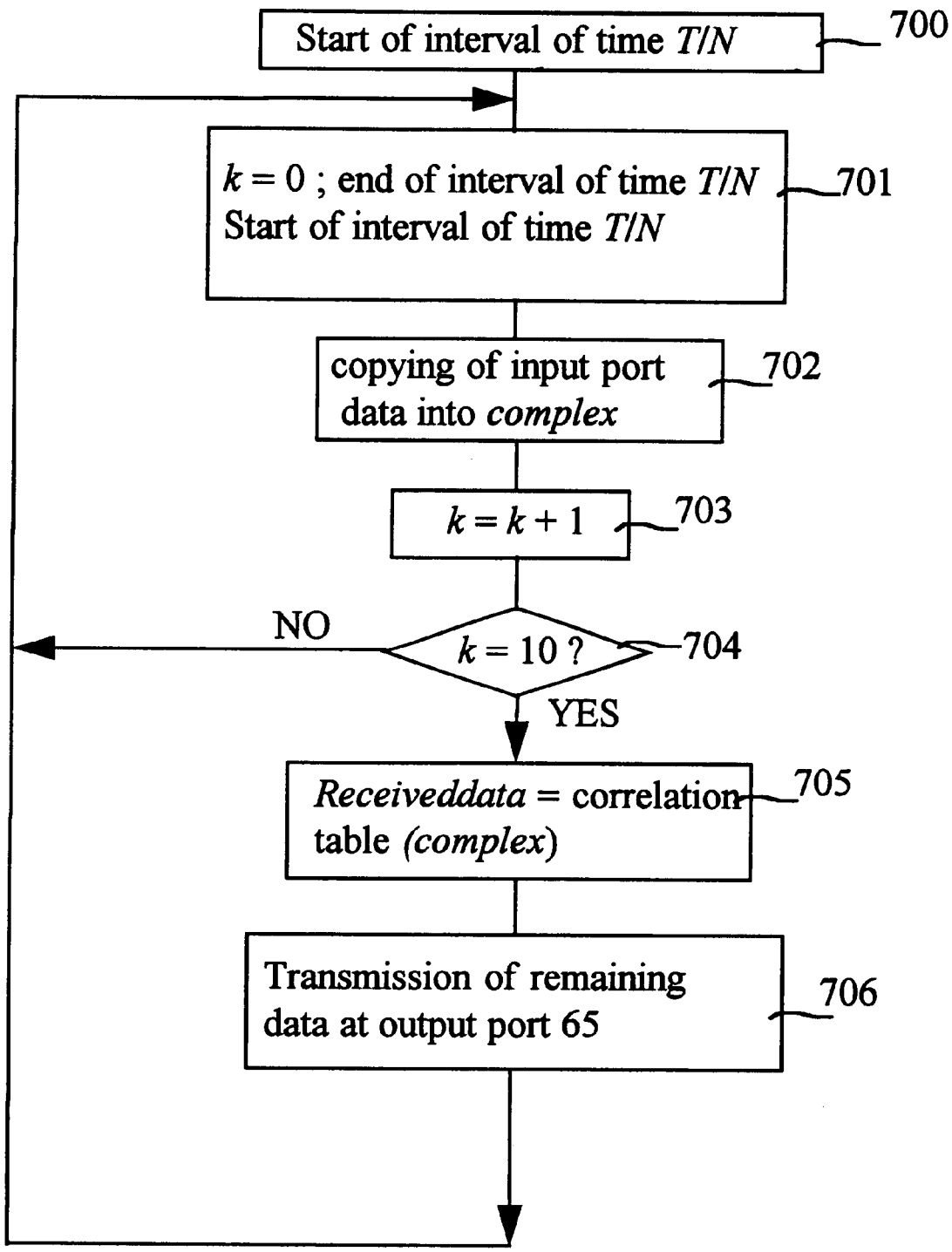
FIG. 7 depicts a signal reception flow diagram according to the invention.

The random access memory 62 includes notably a register complex in which is stored the sequence of pairs in the course of processing, as well as registers storing groups of variables described below, receiveddata and k. The read only memory 63 is adapted to store a table of the sequences which can be transmitted and the operating program of the device and of the central processing unit 61 so that the latter is adapted to implement all the operations presented in the flow diagram in FIG. 7.

This configuration is known to persons skilled in data processing systems and is therefore not described any more precisely here.

During the operation 700 (FIG. 7), an interval of time 7 of duration T/N is commenced.

The operation 701 consists on the one hand of initialising to zero the variable k stored in the register k of the random access memory 62 and on the other hand of awaiting the end of the current interval of time 7 and commencing a new interval of time 7 of duration T/N as soon as the previous one is ended. The operation 701 is performed by the central unit 61 in cooperation with a timer or with clocks, not depicted, normally incorporated in the central unit.

During the operation 702, the central unit 61 performs the reading of the input port 64 and stores in the register complex of the random access memory 62 a pair of values of the real and imaginary parts coming from the demodulator 68. The operation 703 consists of incrementing by one unit the value of the variable k. The test 704 consists of determining whether the number k is equal to ten. If the result of the test 704 is negative, the central unit 61 returns to the start of the operation 701. If the result of the test 704 is positive, the operation 705 puts the sequence of the last ten pairs stored in the register complex in correlation with a data item put in the register receiveddata in the random access memory 62.

In this regard it should be noted that the correlation operation 705 is able to function by comparing the sequence of the last ten pairs stored in the register complex with each of the sixty four sequences of possible pairs stored in the table in the read only memory 63. Each of these comparisons supplies a statistically representative value of the probability of correlation between these sequences. The operation 705 thus consists of choosing the sequence of pairs possible which has a maximum comparison value, that is to say a maximum correlation probability, in accordance with known techniques of comparing sequences. Then the operation 705 puts the first pair of the sequence in correlation with a data item, in accordance with a correlation which is the inverse of that used in the course of the operation 503.

The operation 706 consists of transmitting the data resultant from the operation 705 to the output port 65. Then the central unit 61 returns to the operation 701.

Figure 8:
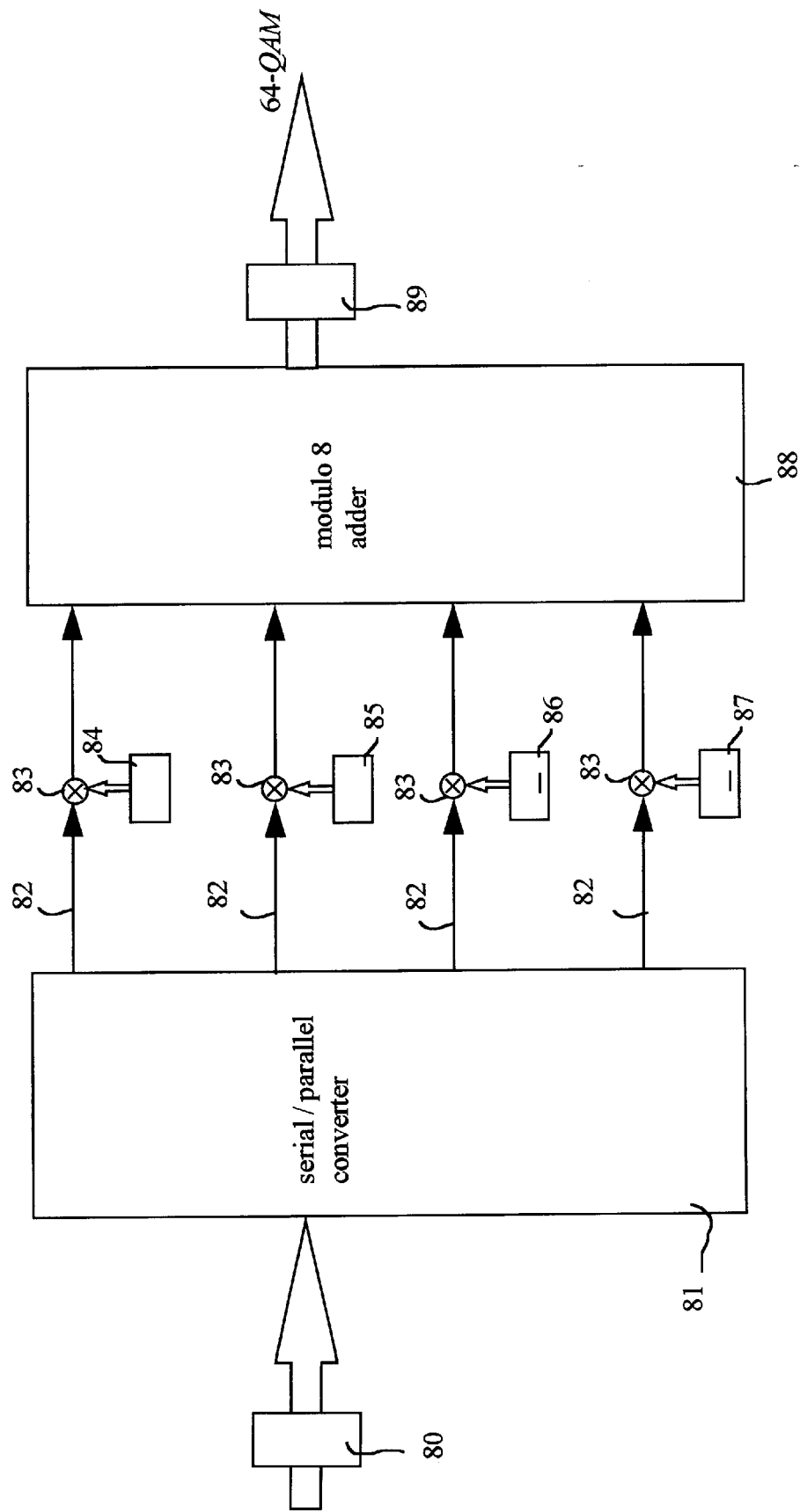
FIG. 8 depicts a highly simplified block diagram of a transmitter according to a preferred variant of the invention.

According to a preferential variant depicted in FIG. 8, for the purpose of transmitting more data during a given interval of time, the data to be transmitted, referred to as primary, are represented by so-called "intermediate" sets of data, and each of the intermediate data items is processed as described above, by means of a dedicated processing channel. All the channels for processing intermediate data use the same transmission frequency but, for each intermediate data channel, the multiplication factor is peculiar, two different channels not using the same multiplication factor. Then the pairs of values representing phase and amplitude coming from the processing channels are combined, here modulo 8, in order to supply a new pair of phase and amplitude values which is transmitted to the modulator.

In this variant, the lowest common multiple of the numbers of different powers of the multiplication factors corresponding to the processing channels is twelve, these powers corresponding to the operation which effects the product of $a_1+b_1$. B and $a_2+b_2$. B so as to give:

$$(a_1.a_2+7.b_1b_2)+(b_1a_2+b_2a_1+7b_1b_2).B. \quad (10)$$

The transmission means is therefore adapted, in each channel, to multiply the previous value of the number of the set by a constant multiplication factor specific to the channel, each time a period T/N has elapsed.

In FIG. 8 there are depicted a data input 80, a serial/parallel converter 81, four processing channels 82 each having a combination means 83 and one of four generators of multiplication factors 84 to 87, an adder 88 and a modulator 89.

Figure 4:
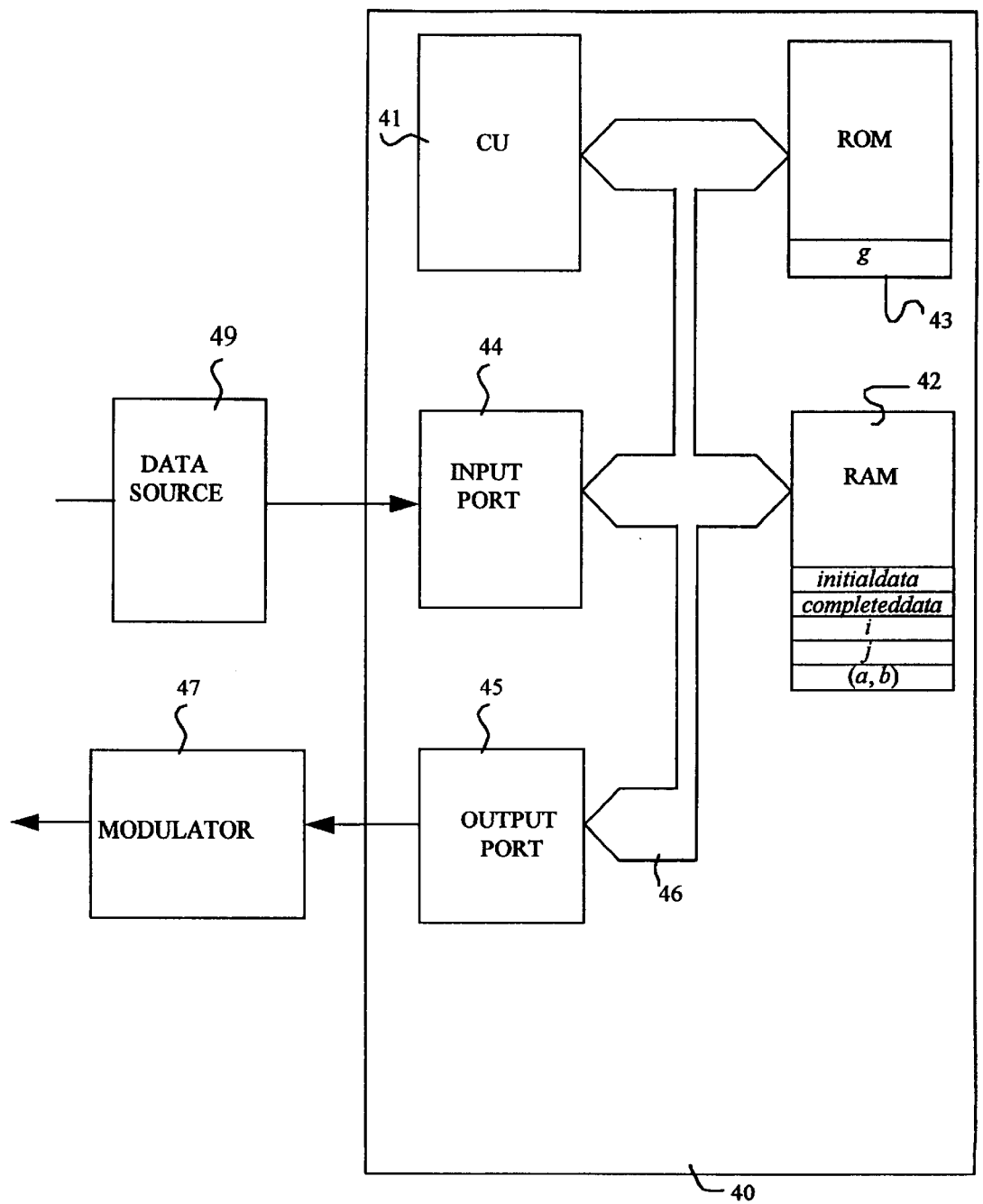
FIG. 4 depicts a means for sending signals according to the invention.

The data input 80 supplies data to be transmitted, data coming from the data source 49 (FIG. 4).

The serial/parallel converter 81 distributes the data to be transmitted into four groups of intermediate data. In the example described, each intermediate data item is represented in the form of six binary data. It is therefore twenty four binary data which are transmitted during each operating period of the device.

It will however be observed that the products of the same multiplication factor chosen as indicated above and two different complex numbers can be identical, because the calculations are performed modulo 8. This can, on reception, give rise to a confusion between the symbols transmitted.

In order to avoid this problem, two additional characteristics of the invention can be used:

- either the choice of the multiplication factors used is limited;
- or the values of the symbols transmitted are limited (in this second case, by being limited to the symbols whose real and imaginary parts are less than or equal to 4, it is possible to transmit only sixteen binary data during each operating period of the device).

Each processing channel 82 has a combination means 83 and a generator of multiplication factors 84 to 87. This representation corresponds in fact to a circuit similar to that presented in FIG. 4, with the exception of the data source 49 which is here replaced by one of the four outputs of the serial/parallel converter 81 and of the modulator 47 which is here replaced by an input of the adder 88. Each of the channels 82 has a different multiplication factor, the successive powers of which are multiplied by the intermediate data transmitted by the channel in question.

Each channel thus supplies a pair of values, one of which is the multiplication factor of the unit and the other the multiplication factor of the number B presented above, this pair changing value 10 times during each operating period of the device, that is to say in order to represent the same group of six binary data.

It should be stated that the pair changes value in fact twelve times but the sixth and twelfth results are extracted.

The adder 88 continuously performs the sum, modulo 8, of the first members (the real part) of the pairs coming from the four channels on the one hand and the sum, modulo 8, of the second members (the imaginary part) of the pairs coming from the four channels on the other hand. The output of the adder 88 therefore supplies a pair.

The modulator 89 transmits a signal whose phase and amplitude correspond to the pair coming from the adder 88, in accordance with the representation presented with regard to FIG. 3.

It will be observed that the functioning of the four processing channels can be provided by a single device as presented in FIG. 4, the calculations necessary for the simultaneous operations of the four processing channels being particularly simple to perform.

It will also be observed that, at decoding, the sequences of pairs received are correlated with four sequences of intermediate pairs in the same way as described previously with regard to FIG. 7, optimising the choice of the four intermediate sequences in accordance with the probability of the absence of error in interpretation. Then these four pairs of intermediate data are correlated with data transmitted to the output port, by a parallel/serial converter functioning reciprocally with the serial/parallel converter 81.

Naturally the invention is not limited to the quadrature amplitude modulation having 64 different pairs of phases and amplitudes, in quadrature, and commonly referred to as 64-QAM by persons skilled in the art, but quite the contrary extends to any improvements, variants and modifications within the range of persons skilled in the art.

For example, in the case of order 16 quadrature amplitude modulation, with which a 16 point structure is associated, with the same notation as previously but using additions, subtractions and products modulo 4, the constant multiplication factor g can be chosen so as to be equal to:

$$1+3.B. \quad (11)$$

As a variant, if the choice is not made to use a constant multiplication factor, it is possible to choose sequences whose probabilities of confusion between them are minimal, in accordance with known mathematical analysis techniques.

According to a particularly simple variant, only the phase between the successive intervals of time which divide an interval of time during which a single data item is represented is caused to vary.

I claim:

1. A method of data transmission by modulation of periodic signals so as to transmit a plurality of items of data, said method comprising the steps of:

correlating each of the plurality of items of data with a respective plurality of pairs of phase and amplitude values, wherein each plurality of pairs of phase and amplitude values includes N such pairs and N is equal to at least two, and wherein each item of data has a data transmission period equal to T; and successively sending, for each of the plurality of items of data, a sequence of N periodic signals for a total period equal to T, each periodic signal having phase and amplitude values respectively corresponding to the phase and amplitude values of one of the pairs for the correlated item of data.

2. A method according to claim 1, wherein each of the N periodic signals is sent for an individual period equal to T/N.

3. A method according to claim 1, further comprising the step of:

choosing one of a plurality of sets of sequences of N periodic signals to represent the plurality of items of data to be transmitted, wherein each of the plurality of sets of sequences has a same number of sequences and a respective energy, wherein, for each of the plurality of sets, there is defined a respective mean square value of a ratio of the energy of the set to a mean value of an energy of all the sequences in the set, and wherein the mean square value of the chosen set is smaller than an average value of the mean square values of all others of the plurality of sets.

4. A method according to claim 1, wherein each of the sequences of periodic signals has a respective probability of error in interpretation, and wherein said method uses sequences of periodic signals that have probabilities of error that are substantially equal.

5. A method according to claim 1, wherein, within each plurality of pairs, each pair of phase and amplitude values, other than a first pair, is derived from a function combining a previous pair of phase and amplitude values with a constant pair of phase and amplitude values.

6. A method according to claim 5, wherein an ordered pair of figures (a,b) is used for locating each pair of phase and amplitude values in a coordinate space, wherein each of a and b is an integer between 0 and n−1 inclusive, and wherein n is a selected integer.

7. A method according to claim 6, wherein the function operates by associating an ordered pair $(a_1a_2+(n-1)b_1b_2, b_1a_2+b_2a_1+(n-1)b_1b_2)$ with two ordered pairs $(a_1,b_1)$ and $(a_2,b_2)$, each addition being performed modulo n.

8. A method according to claim 7, wherein n is equal to 8 and wherein the constant pair has a period of 12.

9. A method of transmitting data by modulation of periodic signals, said method comprising the steps of:

distributing data among a plurality of processing channels;

within each processing channel, processing the data distributed thereto in accordance with the method of claim 1 to generate successive pairs of phase and amplitude values; and sending in succession a combination of the successive pairs respectively generated in the plurality of processing channels.

10. An apparatus for transmitting data supplied from a data source with a period T by modulation of periodic signals, said apparatus comprising:

an encoder for supplying, for each of a plurality of items of data to be transmitted, a respective plurality of pairs of first and second values, wherein each plurality of pairs includes N such pairs, each first value represents a phase, each second value represents an amplitude and N is equal to at least two; and a modulator for sending, in response to each plurality of pairs supplied from said encoder, a sequence of N periodic signals, modulated in accordance with the first and second values of the respective plurality of pairs, for a total period equal to T.

11. An apparatus according to claim 10, wherein each of the N periodic signals is sent for an individual period equal to T/N.

12. An apparatus according to claim 10, wherein said encoder supplies each plurality of pairs such that one of a plurality of sets of sequences of N periodic signals is chosen to represent the respective item of data, wherein each of the plurality of sets of sequences has a same number of sequences and a respective energy, wherein, for each of the plurality of sets, there is defined a respective mean square value of a ratio of the energy of the set to a mean value of an energy of all the sequences in the set, and wherein the mean square value of the chosen set is smaller than an average value of the mean square values of all others of the plurality of sets.

13. An apparatus according to claim 10, wherein each of the sequences of periodic signals has a respective probability of error in interpretation, and wherein said apparatus uses sequences of periodic signals that have probabilities of error that are substantially equal.

14. An apparatus according to claim 10, wherein said encoder includes combination means for deriving, within each plurality of pairs, each pair of phase and amplitude values, other than a first pair, from a function combining a previous pair of phase and amplitude values with a constant pair of phase and amplitude values.

15. An apparatus according to claim 14, wherein said combination means uses an ordered pair of figures (a,b) for locating each pair of phase and amplitude values in a coordinate space, wherein each of a and b is an integer between 0 and n−1 inclusive, and wherein n is a selected integer.

16. An apparatus according to claim 15, wherein the function used by said combination means operates by associating an ordered pair $(a_1a_2+(n-1)b_1b_2, b_1a_2+b_2a_1+(n-1)b_1b_2)$ with two ordered pairs $(a_1,b_1)$ and $(a_2,b_2)$, each addition being performed modulo n.

17. An apparatus according to claim 16, wherein n is equal to 8 and wherein the constant pair has a period of 12.

18. Apparatus for transmitting items of data supplied from a data source with a period T by modulation of periodic signals, said apparatus comprising:

a plurality of processing channels;

a serial/parallel converter for distributing the items of data supplied by the data source among the plurality of processing channels, wherein each processing channel includes an encoder for supplying, for each of the items of data, a respective plurality of pairs of first and second values, wherein each plurality of pairs includes N such pairs, each first value represents a phase, each second value represents an amplitude and N is equal to at least two;

a combining circuit for combining the pluralities of pairs from said plurality of processing channels into a single stream of pluralities of pairs; and a modulator for sending, in response to each plurality of pairs supplied from said combining means, a sequence of N periodic signals, modulated in accordance with the first and second values of the respective plurality of pairs, for a total period equal to T.

19. Apparatus for receiving data in the form of a modulated periodic signal, said apparatus comprising:

receiving means for receiving a plurality of sequences of N modulated periodic signals, wherein each sequence is received during a total period equal to T and wherein N is at least 2;

means for identifying, from each received sequence, a plurality of N pairs of values representing pairs of phase and amplitude values presented successively by the N periodic signals of the respective sequence; and correlating means for correlating the N pairs of values for each received sequence with a respective item of data, wherein each item of data can take one of a number of values that is no greater than a defined greatest number of pairs of phase and amplitude values.

20. An apparatus according to claim 19, wherein each of the periodic signals has an individual period of T/N and represents a pair of phase and amplitude values.

21. A facsimile apparatus comprising an apparatus for transmitting data supplied from a data source with a period T by modulation of periodic signals according to claim 10.

22. A facsimile apparatus comprising an apparatus for transmitting data supplied from a data source with a period T by modulation of periodic signals according to claim 18.

23. A facsimile apparatus comprising an apparatus for receiving data in the form of a modulated periodic signal according to claim 19.

24. A computer comprising an apparatus for transmitting data supplied from a data source with a period T by modulation of periodic signals according to claim 10.

25. A computer comprising an apparatus for transmitting data supplied from a data source with a period T by modulation of periodic signals according to claim 18.

26. A computer comprising an apparatus for receiving data in the form of a modulated periodic signal according to claim 19.

27. A data capture system including a sensor for transmitting signals representing a physical quantity comprising an apparatus for transmitting data supplied from a data source with a period T by modulation of periodic signals according to claim 10.

28. A data capture system including a sensor for transmitting signals representing a physical quantity comprising an apparatus for transmitting data supplied from a data source with a period T by modulation of periodic signals according to claim 18.

29. A data reproduction system including a processor for processing a physical quantity on a medium comprising an apparatus for receiving data in the form of a modulated periodic signal according to claim 19.

* * * * *

UNITED STATES PATENT AND TRADEMARK OFFICE
CERTIFICATE OF CORRECTION

PATENT NO. : 6,084,918  
DATED : July 4, 2000  
INVENTOR(S) : Philippe Piret

Page 1 of 2

It is certified that error appears in the above-identified patent and that said Letters Patent is hereby corrected as shown below:

[56] References Cited, Other Publications,
After "P.Z. Fan et al.," "sequence" should read -- sequences --.

Column 2,
Line 17, "said" should be deleted.
Line 19, "fist men-" should read -- first-men --.

Column 7,
Line 14, "to 7A" should read -- to –7A --.

Column 8,
Line 37, "central unit 41" should read -- central processing unit 41 --;
Line 66, "central unit 41" should read -- central processing unit 41 --.

UNITED STATES PATENT AND TRADEMARK OFFICE
CERTIFICATE OF CORRECTION

PATENT NO. : 6,084,918
DATED : July 4, 2000
INVENTOR(S) : Philippe Piret

It is certified that error appears in the above-identified patent and that said Letters Patent is hereby corrected as shown below:

Column 9,
Line 5, "central unit 41" should read -- central processing unit 41 --.

This certificate supercedes certificate of correction issued April 17, 2001.

Signed and Sealed this

Seventh Day of August, 2001

*Attest:*

*Attesting Officer*

NICHOLAS P. GODICI
*Acting Director of the United States Patent and Trademark Office*